US006162890A

United States Patent [19]
George et al.

[11] Patent Number: 6,162,890
[45] Date of Patent: *Dec. 19, 2000

[54] WATER-DISPERSIBLE BLOCK COPOLYESTERS USEFUL AS LOW-ODOR ADHESIVE RAW MATERIALS

[75] Inventors: Scott Ellery George; Bobby Jones Sublett; Richard Anthony Miller, all of Kingsport, Tenn.

[73] Assignee: Eastman Chemical Company, Kingsport, Tenn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/954,370

[22] Filed: Oct. 20, 1997

Related U.S. Application Data

[63] Continuation-in-part of application No. 08/651,246, May 21, 1996, Pat. No. 5,709,940, which is a continuation of application No. 08/328,744, Oct. 24, 1994, abandoned.

[51] Int. Cl.[7] .................................................. C08G 63/65
[52] U.S. Cl. .................... 528/295; 528/300; 528/301; 528/302; 528/308; 528/308.6; 525/437; 525/444; 524/81
[58] Field of Search ..................................... 528/295, 300, 528/301, 302, 308, 308.6; 525/437, 444; 524/81

[56] References Cited

U.S. PATENT DOCUMENTS

| | | |
|---|---|---|
| 3,018,272 | 1/1962 | Griffing et al. ............................ 260/75 |
| 3,033,822 | 5/1962 | Kibler et al. . |
| 3,075,952 | 1/1963 | Coover et al. ............................. 260/75 |
| 3,546,008 | 12/1970 | Shields et al. . |
| 3,734,874 | 5/1973 | Kibler et al. . |
| 3,779,993 | 12/1973 | Kibler et al. . |
| 4,101,274 | 7/1978 | Beutler et al. ............................... 8/173 |
| 4,156,073 | 5/1979 | Login ....................................... 528/295 |
| 4,158,083 | 6/1979 | Login ....................................... 428/389 |
| 4,167,395 | 9/1979 | Engelhardt et al. .......................... 8/173 |
| 4,168,145 | 9/1979 | Hintermeier et al. ........................ 8/173 |
| 4,215,026 | 7/1980 | Login ..................................... 260/292 E |
| 4,233,196 | 11/1980 | Sublett . |
| 4,250,296 | 2/1981 | Weckler et al. .......................... 528/295 |
| 4,252,532 | 2/1981 | Engelhardt et al. ......................... 8/557 |
| 4,300,580 | 11/1981 | O'Neill et al. .............................. 132/7 |
| 4,304,901 | 12/1981 | O'Neill et al. . |
| 4,329,391 | 5/1982 | McAlister . |
| 4,480,085 | 10/1984 | Larson .................................... 528/295 |
| 4,483,976 | 11/1984 | Yamamoto et al. . |
| 4,525,524 | 6/1985 | Tung et al. . |
| 4,598,142 | 7/1986 | Hilbert et al. ............................ 528/295 |
| 4,632,874 | 12/1986 | Smith ...................................... 428/394 |
| 4,946,932 | 8/1990 | Jenkins ................................... 528/272 |
| 5,218,042 | 6/1993 | Kuo et al. ............................... 524/601 |
| 5,290,631 | 3/1994 | Fleury et al. . |
| 5,366,804 | 11/1994 | Dugan .................................... 428/373 |
| 5,543,488 | 8/1996 | Miller et al. . |
| 5,552,495 | 9/1996 | Miller et al. . |
| 5,552,511 | 9/1996 | Miller et al. . |
| 5,571,876 | 11/1996 | Miller et al. . |
| 5,605,764 | 2/1997 | Miller et al. . |
| 5,709,940 | 1/1998 | George et al. ............................ 428/364 |

FOREIGN PATENT DOCUMENTS

| | | |
|---|---|---|
| 0 761 795 | 3/1997 | European Pat. Off. . |
| 2438379 | 2/1976 | Germany . |
| 37-12149 | 8/1962 | Japan . |
| 92/02583 | 2/1992 | WIPO . |
| WO 95/05413 | 2/1995 | WIPO . |

OTHER PUBLICATIONS

UM, Sung Ip et al., "Morphological Core/Shell Structure and Dispersion Stability of Water–Dispersible Copolyester Graft Polymerized with Acrylic Acid and Thyl Acrylatye", *Journal of Applied Polymer Sciences*, vol. 60, pp. 1587–1593 (1996).

*Primary Examiner*—John M. Cooney, Jr.
*Attorney, Agent, or Firm*—Rose M. Allen; Jonathan D. Wood; Harry J. Gwinnell

[57] ABSTRACT

Disclosed are linear, water-dispersible sulfopolyesters incorporating a low molecular weight polyethylene glycol and blocks of a high molecular weight polyethylene glycol. The block sulfopolyesters have improved toughness, abrasion resistance, flexibility, and adhesion. Particular utility is realized in polyester fiber sizing applications and as an adhesive.

36 Claims, No Drawings

WATER-DISPERSIBLE BLOCK COPOLYESTERS USEFUL AS LOW-ODOR ADHESIVE RAW MATERIALS

CROSS-REFERENCE TO RELATED APPLICATIONS

This Application is a Continuation-in-Part of U.S. application Ser. No. 08/651,246, filed May 21, 1996 now U.S. Pat. No. 5,709,940, which is a File Wrapper Continuation of U.S. application Ser. No. 08/328,744, filed Oct. 24, 1994, now abandoned.

FIELD OF THE INVENTION

This invention relates to linear, water-dispersible sulfopolyesters prepared using high molecular weight polyethylene glycol blocks and low molecular weight polyethylene glycol.

BACKGROUND

Water-dispersible sulfopolyesters incorporating polyethylene glycol (PEG) units are known in the art. For example, U.S. Pat. Nos. 3,546,008, 3,734,874 and 3,779,993, teach compositions useful as a size for fabrics. These references disclose a very large number of linear compositions that are limited to PEG contents of greater than 15 mol %, based on 100 mol % of total glycol, within a PEG molecular weight range of 106 to 898 g/mol. Although it is disclosed that more than one PEG could be present in a particular composition, there is no teaching or example of the advantageous use of combinations of polyethylene glycols having different molecular weights.

The incorporation of high molecular weight PEGs is the subject of U.S. Pat. No. 4,233,196, where a molecular weight range of 106 to 22,018 g/mol was specified for the PEG component. Although both low and high molecular weight PEGs could be incorporated in a particular composition, the invention was limited to less than 15 mol % of total PEG based on 100 mol % of total glycol.

U.S. Pat. Nos. 4,329,391, 4,483,976, 4,525,524, and 5,290,631 disclose additional water-dispersible sulfopolyester compositions. However, all of these patents are limited to PEGs having molecular weights of less than 600 g/mol.

Recently, European Patent Application 0 761 795 described hot melt adhesives based on 10–90 weight percent of a sulfonated polyester, which can be the condensation product of a difunctional dicarboxylic acid, a sulfomonomer containing at least one metallic sulfonate group, a glycol, and optional ingredients. There is no disclosure of using both high and low molecular weight PEGs.

The utility of certain water-dispersible sulfopolyester compositions as adhesive raw materials is also described in detail by the teachings of U.S. Pat. Nos. 5,543,488; 5,552,495; 5,552,511; 5,571,876; and 5,605,764, and European Patent Application EP 0 761 795 A2.

Among the many problems associated with prior art compositions utilizing sulfonated polyesters is the distinctive and unpleasant odor associated with the final product. The odor is highly undesirable, particularly when used, for instance, as an adhesive composition. It would be beneficial if a composition could be formulated having the advantageous aspects of sulfonated polyesters without the undesirable odor.

The prior art disclosures relating to water-dispersible sulfopolyesters do not recognize the advantageous combinations of both low and high molecular weight PEGs and the benefits thereof. In addition, none of the examples given above are described as block copolyesters, indicating that the inventors were unaware of the structure/property advantages obtainable from specific architectures.

However, it is important to recognize that a block architecture, by itself, will not necessarily lead to desired property improvements. In some cases a block architecture may actually have a deleterious effect on properties; for example, a high content of certain high molecular weight PEGs in the final polymer may lend unacceptable water-sensitivity to a particular article of manufacture. Therefore, it is not obvious which block compositions will render the key property improvements that are described hereinafter.

Thus there is a need for a water-dispersible sulfopolyester composition that has improved properties, particularly a low odor, that can be made by simple selection of the proper block architecture.

SUMMARY OF THE INVENTION

The present invention concerns linear, water-dispersible sulfopolyesters that incorporate both low and high molecular weight polyethylene glycols. The structure of a polyethylene glycol is represented by formula (I):

$$H—(OCH_2CH_2)_n—OH \quad (I)$$

The present invention more particularly concerns sulfonated polyesters having both low and high molecular weight polyethylene glycols, wherein the low molecular weight PEGs are defined by formula (II):

$$H—(OCH_2CH_2)_x—OH \quad (II)$$

where x=2 to 6; and wherein the high molecular weight PEGs are defined by formula (III):

$$H—(OCH_2CH_2)_y—OH \quad (III)$$

where y=3 to 500. The sulfonated polyesters according to the present invention are further characterized as having x<y.

The water-dispersible, sulfopolyester according to the present invention is a copolyester composition made of the reaction products of:

(a) at least one difunctional dicarboxylic acid which does not contain a metal sulfonate group;

(b) an amount sufficient to provide water-dispersibility to said polyester of at least one difunctional sulfomonomer containing at least one metal sulfonate group bonded directly to an aromatic ring, a diol containing a metal sulfonate group bonded directly to an aromatic ring, or a hydroxy acid containing a metal sulfonate group bonded directly to an aromatic ring, wherein the functional groups are ester, hydroxyl or carboxyl;

(c) at least one polyethylene glycol having the structure:

$$H—(OCH_2CH_2)_x—OH \quad (II)$$

where x is an integer ranging from 2 to 6;

(d) at least one polyethylene glycol having the structure:

$$H—(OCH_2CH_2)_y—OH \quad (III)$$

where y is an integer of from 3 to 500;
and further wherein x<y;
the polymer containing substantially equal molar proportions of acid equivalents (100 mol %) and glycol equivalents (100 mol %) and wherein the inherent viscosity is at least 0.1 dL/g measured in a 60/40 parts by weight solution of phenol/tetrachloroethane at 25° C. at a concentration of about 0.50 g of polymer in 100 ml of the solvent.

The polymer can optionally comprise other monomers, such as hydroxycarboxylic acid, and a glycol or mixture of glycols that is (are) not a polyethylene glycol, such as polypropylene glycol. Such additional glycols that are not PEGs preferably contain two primary alcohols, i.e., two —CH$_2$—OH groups;

Accordingly, it is an object of the present invention to describe elastomeric compositions that display excellent toughness and elongation with the retention of water-dispersibility.

It is another object of this invention is to describe compositions having utility as adhesive raw materials that exhibit compatibility with a variety of formulation components and impart water-dispersibility to the finished adhesive.

Yet another object of this invention is to set forth polyester compositions that do not impart odor to either the finished adhesives or the resulting articles of manufacture.

Still another object of the invention is to describe a sulfopolyester-based adhesive able to render articles made therewith more recyclable and more flushable.

These and other objects, features, and advantages of the present invention will become apparent as reference is made to the following detailed description, preferred embodiments, and specific examples.

DETAILED DESCRIPTION OF THE PREFERRED EMBODIMENTS

The present inventors have discovered a linear, block, water-dispersible polyester and compositions thereof, based on the incorporation of low and high molecular weight polyethylene glycol residues.

It is to be understood that by "linear" is meant essentially linear, so that some minor branching is allowed for in the final polymer. It will be recognized by those of skill in the art in possession of the present disclosure that some branching may occur during polymerization. It will be further appreciated by the same artisan that additional branching can be achieved by, for instance, adding branching agents such as trimellitic anhydride; such polymers are not within the scope of the present invention.

In general, the term "block" may be broadly defined as the incorporation of an oligomeric or polymeric segment, consisting of two or more repeat units, within a secondary, dissimilar polymer structure. This term is discussed in more detail below with reference to preferred embodiments of the invention.

The term "water-dispersible" is often used interchangeably with other descriptors, such as "water dissipatable", "water-soluble", or "water-dispellable". In the context of this invention, all of these terms are to refer to the activity of water or a mixture of water and a water-miscible organic cosolvent on the polyesters described herein. Therefore, for the purposes of the present invention the term "water dispersable" is intended to include conditions where the polyester is dissolved to form a true solution or is dispersed within the aqueous medium to obtain a stable product. Often, due to the statistical nature of polyester compositions, it is possible to have soluble and dispersible fractions when a single polyester is acted upon by an aqueous medium.

According to a preferred embodiment of the present invention, as described in the above mentioned U.S. application Ser. No. 08/651,246, which is hereby incorporated by reference in its entirety, and of which the present application is a Continuation-in-Part, a more preferred sulfopolyester used in a sizing composition for textile yarns made from linear polyesters comprises repeat units of the following monomers:

(a) the dicarboxylic acid component is selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms, and is present in the amount of 70 to 100, more preferably 85–100 mole percent, based on the total moles of acid;

(b) the difunctional sulfomonomer component is selected from the group consisting of a dicarboxylic acid or ester thereof containing a metal sulfonate group bonded directly to an aromatic ring, a diol containing a metal sulfonate group bonded directly to an aromatic ring, and a hydroxy acid containing a metal sulfonate group bonded directly to an aromatic ring, and is present in the amount of 2.5 to 20 mole percent, more preferably 4 to 15 mole percent, even more preferably 5 to 12 mole percent, and still more preferably 5 to 10 mole percent, based on total moles of acid and glycol (e.g., based on 200 mol percent);

(c) the low molecular weight polyethylene glycol component represented by formula (II) above, wherein x is an integer from 2 to 6, is present in the amount of 25 to 99.9 mole percent, more preferably 25 to 75 mole percent, based on total moles of glycol; and (d) the high molecular weight polyethylene glycol component represented by formula (III) above, where y is an integer from 20 to 500, is present in the amount of 0.1 to 20 mole percent, more preferably 0.1 to 10 mole percent, even more preferably 0.25 to 5 mole percent, based on total moles of glycol;

wherein the linear, water-dispersible sulfopolyesters will contain substantially equimolar proportions of acid (100 mol %) and hydroxyl (100 mol %) equivalents, such that the total of acid and hydroxyl equivalents is equal to 200 mol %. The sulfopolyester used in the preferred size composition is further characterized by having a Tg of −20° C. to 100° C., more preferably from 30 to 50° C. and an inherent viscosity of 0.1 to 1.1 dL/g, preferably 0.2 to 0.7 dL/g, and more preferably 0.3 to 0.5 dL/g, measured at 23° C. using 0.50 grams of polymer per 100 ml of a solvent consisting of 60/40 (by weight) phenol/tetrachloroethane mixture. There is also a preferred proviso that the mole percent of the high molecular weight polyethylene glycol within the range of y (i.e., 20 to 500) is inversely proportional to the quantity of y within said range, i.e., as y increases, the molecular weight of the species represented by formula (III), decreases.

When used as an adhesive or in an adhesive formulation, the sulfopolyester according to the present invention may be as exactly set forth above for the sulfopolyester used in a size composition. However, it has been found that the useful range of ingredients (a)–(d) above and parameters as x and y in formulas (II) and (III), respectively, is broader for the sulfopolyester used in as an adhesive, as will be described in more detail below. It has been found, for instance, that the useful range of y also includes 3–19 (thus $3 \leq y \leq 500$), as long as x<y, and the viscosity may range from from "water-thin" to a thick paste, depending on the end use. As will be appreciated by the skilled artisan in possession of this disclosure, the exact viscosity will be determined by the end use of the adhesive.

In the sulfopolyester according to the present invention, preferred examples of dicarboxylic acids that may be used as (a) include aliphatic dicarboxylic acids, alicyclic dicarboxylic acids, aromatic dicarboxylic acids, or mixtures of two or more of these acids. Thus, preferred dicarboxylic acids include, but are not limited to succinic; glutaric; adipic; azelaic; sebacic; fumaric; maleic; itaconic; 1,3-cyclohexane dicarboxylic; 1,4-cyclohexanedicarboxylic; iglycolic; 2,5-norbornanedicarboxylic; phthalic; terephthalic; 1,4-naphthalenedicarboxylic; 2,5-naphthalenedicarboxylic; diphenic; 4,4'-oxydibenzoic; 4,4'-sulfonyldibenzoic; and isophthalic. More preferred are isophthalic and terephthalic acids.

It is to be understood that the use of the corresponding acid anhydrides, esters, and acid chlorides of these acids is included in the term "dicarboxylic acid". Preferred diesters are dimethyl terephthalate, dimethyl isophthalate, and dimethyl-1,4-cyclohexanedicarboxylate. Although the methyl ester is the most preferred embodiment, it is also acceptable to include higher order alkyl esters, such as ethyl, propyl, isopropyl, butyl, and so forth. In addition, aromatic esters, particularly phenyl, may also be considered.

The difunctional sulfomonomer component, (b), may advantageously be a dicarboxylic acid or ester thereof containing a metal sulfonate group (—$SO_3M$) or a glycol containing a metal sulfonate group or a hydroxy acid containing a metal sulfonate group. The cation of the sulfonate salt may be a metal ion, such as $Li^+$, $Na^+$, $K^+$, $Mg^{++}$, $Ca^{++}$, $Cu^{++}$, $Ni^{++}$, $Fe^{++}$, $Fe^{+++}$ and the like. It is within the scope of the present invention that the sulfonate salt is non-metallic and may be a nitrogenous base as described in U.S. Pat. No. 4,304,901. A nitrogen based cation will be derived from nitrogen containing bases, which may be aliphatic, cycloaliphatic, or aromatic compounds that have ionization constants in water at 25° C. of $10^{-3}$ to $10^{-10}$, preferably $10^{-5}$ to $10^{-8}$. Examples of preferred nitrogen containing. bases are ammonia, pyridine, morpholine, and piperidine. It is known that the choice of cation will influence, often markedly, the water-dispersibility of the resulting polymer.

Depending on the end-use application of the polymer, either a more or less easily dispersible product may be desirable. It is within the skill of the artisan in possession of the present disclosure to modify the dispersibility for the desired end use. It is possible to prepare the polyester using, for example, a sodium sulfonate salt and then by ion-exchange methods replace the sodium with a different ion, such as zinc, when the polymer is in the dispersed form. This type of ion-exchange procedure is generally superior to preparing the polymer with divalent and trivalent salts inasmuch as the sodium salts are usually more soluble in the polymer reactant melt-phase. Also, the ion-exchange procedure is usually necessary to obtain the nitrogenous counterions, since amine salts tend to be unstable at typical melt processing conditions. Advantageous difunctional sulfomonomers are those where the sulfonate salt group is attached to an aromatic acid nucleus, such as benzene, naphthalene, diphenyl, oxydiphenyl, sulfonyidiphenyl, or methylenediphenyl. Preferred results are obtained through the use of sulfophthalic acid, sulfoterephthalic acid, sulfoisophthalic acid, 4-sulfonaphthalene-2,7-dicarboxylic acid, and their esters as described in U.S. Pat. No. 3,779,993, the disclosure of which is incorporated herein by reference. Particularly superior results are achieved when the difunctional sulfomonomer is 5-sodiosulfoisophthalic acid or esters thereof. It is preferred that reactant (b) be present in an amount of 5 to 40 mol %, more preferably about 8 to 30 mol %, and most preferably about 9 to 25 mol %, based on the total acid equivalents.

Although not preferred for the practice of this invention, either in a size composition or an adhesive composition, it is possible to include from 0 to 50 mol percent, based on total carboxyl and hydroxyl equivalents, of a hydroxycarboxylic acid. These hydroxycarboxylic acids may be aromatic, cycloaliphatic, or aliphatic and generally contain 2–20 carbon atoms, one —$CH_2OH$ group and one COOH or COOR group.

The lower molecular weight polyethylene glycol, (c), is represented by formula (II):

$$HO—(CH_2CH_2—O)_x—H \qquad (II)$$

where x is an integer of at least 2 but less than or equal to 6. Preferred examples of lower molecular weight polyethylene glycols are: diethylene glycol, triethylene glycol, and tetraethylene glycol; diethylene and triethylene glycol are most preferred.

It is important to recognize that certain glycols of (c) may be formed in-situ, due to side reactions that may be controlled by varying the process conditions. The preferred example of this is the formation of varying proportions of diethylene, triethylene, and tetraethylene glycols from ethylene glycol due to an acid-catalyzed dehydration, which occurs readily when a buffer is not added to raise the pH of the reaction mixture (i.e., render the reaction mixture less acidic). Additional compositional latitude is possible if the buffer is omitted from a feed containing various proportions of ethylene and diethylene glycols or ethylene, diethylene, and triethylene glycols.

The high molecular weight polyethylene glycol component, (d), is used to place hydrophilic, but non-ionic blocks within the polymer backbone. In addition to the benefit of a secondary means to tailor the hydrophilicity of the sulfopolyester, a number of other advantages, for example, lower melt viscosity, improved adhesion, and increased abrasion resistance, may be realized from specific block sulfopolyester compositions.

As mentioned above, generally the term "block" may be broadly defined as the incorporation of an oligomeric or polymeric segment, consisting of two or more repeat units, within a secondary, dissimilar polymer structure. In the context of this invention, the term "block" is more narrowly defined as a sulfopolyester containing polyethylene glycol segments ranging from 3 to 500 repeat units. In the case of a size composition, it is preferred that the sulfopolyester contain polyethylene glycol segments ranging from 20 to 500, preferably 22 to 100 repeat units. In the case of the adhesive composition, it has surprisingly been found that the useful range is larger, and here the sulfopolyester may contain polyethylene glycol segments ranging from 3 to 500, with the preferred proviso that these segments be greater than the segments in component (c).

Thus, the definition of the term "block", as used in the present invention, is based on specific performance/properties of the sulfopolyester.

Representative examples of useful high molecular weight polyethylene glycols of the formula (III):

$$HO—(CH_2CH_2—O)_y—H \qquad (III)$$

where $(3 \leq y \leq 500)$, include such commercially available products as "Carbowax", a product of Union Carbide.

When used as a size or as an adhesive, it is preferred that y is 20 or greater. However, when used as an adhesive the useful range of y is greater, and may be from 3 to 500, as long as x in formula (II) is less than y in formula (III). In the case of $20 \leq y \leq 500$, the molecular weight of (d) may range from greater than 900 to about 22,000 g/mol. The preferred molecular weight range is from about 1000 to about 4500.

It is preferred that the molecular weight and the mol % of (d) are inversely proportional to each other; specifically, as the molecular weight is increased the mol % of (d) will be decreased.

Although not intending to be limiting, it is illustrative of this concept to consider that a PEG having a molecular weight of 1000 may constitute up to 10 mol % of the total glycol, while a PEG having a molecular weight of 10,000 would typically be incorporated at a level of less than one (1) mole percent of the total glycol. For use as a size or as an adhesive, it is preferred that reactant (d) is present in an amount of 0.1 to 10 mol %, preferably 1 to 5 mol %. based on total moles of glycol, although again particularly when used as an adhesive the useful range of (d) can be greater.

It is to be understood that additional glycol components, different from (c) and (d) above, may be added. It is preferred that such glycols contain at least two primary alcohol groups. More preferred examples include, but are not limited to, aliphatic, alicyclic, and aralkyl glycols. Examples of these more preferred glycols include ethylene glycol; propylene glycol; 1,3-propanediol; 2,4-dimethyl-2-ethylhexane-1,3-diol; 2,2-dimethyl- 1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

To obtain the polymers of this invention, the difunctional sulfomonomer is most often added directly to the reaction mixture from which the polymer is made; other processes are known and may also be employed. Illustrative examples from the art are U.S. Pat. Nos. 3,018,272; 3,075,952; and 3,033,822. These patents disclose interchange reactions as well as polymerization of build-up processes.

Briefly, a typical procedure consists of at least two distinct stages; the first stage, known as ester-interchange or esterification, is conducted under an inert atmosphere at a temperature of 150 to 250° C. for 0.5 to 8 hours, preferably from 180 to 230° C. for 1 to 4 hours. The glycols, depending on their reactivities and the specific experimental conditions employed, are commonly used in molar excesses of 1.05–2.5 moles per total moles of acid-functional monomers. The second stage, referred to as polycondensation, is conducted under reduced pressure at a temperature of 230 to 350° C., preferably 250 to 310° C., and more preferably 260 to 290° C. for 0.1 to 6 hours, preferably 0.25 to 2 hours. Stirring or appropriate conditions are used in both stages to ensure adequate heat transfer and surface renewal of the reaction mixture. The reactions of both stages are facilitated by appropriate catalysts, especially those well-known in the art, such as alkoxy titanium compounds, alkali metal hydroxides and alcoholates, salts of organic carboxylic acids, alkyl tin compounds, metal oxides, and so forth. A three-stage manufacturing procedure, similar to the disclosure of U.S. Pat. No. 5,290,631, may also be used, particularly when a mixed monomer feed of acids and esters is employed.

Dispersions may be obtained by adding molten or solid polymer into water with sufficient agitation.

Sizing Compositions and Sized Fibrous Articles of Manufacture

Specific examples of the sulfopolyester compositions described supra may be used advantageously as sizing compositions for textile yarns made from linear polyesters. When multifilament polyesters yarns are fabricated into textiles it is desirable to treat the warp yarn, before weaving, with a sizing composition that adheres and binds several filaments together. The treatment process, known as "sizing", imparts strength and abrasion resistance to the yarn during the weaving process. It is also critical that the sizing composition be completely removable from the woven fabric. Increased abrasion resistance will result in fewer breaks during the weaving process, which improves the quality of the textile product. Thus, one aspect of this invention is directed toward sizing compositions and fibrous articles of manufacture sized therewith. Although the described application is in reference to polyester yarns, such as poly (ethylene terephthalate) or poly(1,4-cyclohexanedimethylene terephthalate), the compositions described hereinafter may be used as sizes for a variety of natural and synthetic yarns. Examples of non-polyester yarns include rayon, acrylic, polyolefin, cotton, nylon, and cellulose acetate. Blends of polyester and non-polyester yarns are also within the scope of fibers that may be effectively sized.

It is necessary for the size compositions to possess adequate resistance to blocking, which is most critically manifested when the fiber is wound on a warp beam or bobbin and stored for extended periods of time under ambient conditions. Blocking causes the sized fibers to meld together, which prohibits them from being unwound at the desired time. The tendency for blocking to occur under both normal and extreme ambient conditions of temperature and humidity may be directly related to the Tg of the size composition. Therefore, a dry Tg ranging from 30 to 60° C., preferably 35 to 50° C. is required to avoid blocking problems. This requirement necessitates careful selection of the acid and glycol components; for example too high a level of PEG will detrimentally lower the Tg and result in blocking. In general, as the length or molecular weight of a polyethylene glycol monomer is increased, at a constant molar percentage of incorporation, the Tg of the final polymer will be proportionately decreased.

Adhesion, flexibility and, in part, desizability and water resistance are also related to the PEG molecular weight and content of the sulfopolyester. As the PEG content is increased, hydrophilicity, flexibility, and adhesion are also increased. If the PEG content and/or molecular weight is too high, then the resulting size will have a low Tg and marginal water resistance. The properties of desizability, water resistance, flexibility, and adhesion are also related to the content of sulfomonomer (SIP). If the SIP level is too high, the water resistance, flexibility, and economics of the size will be lessened, while a functionally low level of SIP tends to detract from the adhesion and will prevent adequate desizing after the weaving operation. The key property, as a result of this invention, is the abrasion resistance. The utility of the Duplan Cohesion Tester, as a measurement of abrasion resistance for a sized yarn, is well known to those in the art. Briefly, the Duplan test is performed on samples of sized yarn, under constant tension, that are abraded by friction plates moving back and forth over said yarn at a constant rate. The average number of cycles to separate the yarn filaments is reported as the abrasion resistance or Duplan value. Hence, higher Duplan values are a direct indicator of the suitability of the sulfopolyester as a size material. It is critical to the efficacy of this invention that the sulfopolyester contain blocks of high molecular weight PEG to obtain excellent abrasion resistance; at least 0.25 mol % and not greater than 5 mol %, depending on molecular weight, of a high molecular weight PEG will provide a sulfopolyester having excellent size properties. The molecular weight of the PEG will advantageously fall in the range from 900 to 4500, preferably 1000 to 2000 grams/mol. For optimum performance, the overall molecular weight of the sulfopolyester is at least 0.25 dL/g, preferably greater than 0.3 dL/g. Molecular weights for the present sulfopolyester according to the present invention, as set forth in this disclosure, are determined by GPC and can readily be determined by one of ordinary skill in the art.

In summary, this particular preferred embodiment of the invention, which is related to a size material and the fibrous articles of manufacture sized therewith, may be described in a preferred embodiment as a linear, water-dispersible sulfopolyester useful as a size on fabrics of all types, including woven and non-woven fabrics.

Adhesive Raw Material Compositions, Formulated Adhesives, and Articles of Manufacture In another preferred embodiment of the present invention, the sulfopolyester according to the present invention is also useful as an adhesive raw material and specific examples of the sulfopolyester compositions may be used, in even more preferred embodiments, for both hot-melt and liquid adhesive formulations, for pressure sensitive adhesives (PSAs), and hot-melt PSAs. Furthermore, it is within the scope of this invention to include a process of applying the adhesive formulations described hereinafter on a single substrate or between two substrates to form a laminate. One of the more surprising discoveries of the present inventors is that a composition according to the present invention is useful as an adhesive on a variety of substrates including, but not limited to, plastics, metals, fabrics, wood, and wood-derived products such as paper. By "paper" is meant a material containing wood pulp, which may contain a variety of other additives and may be coated or uncoated.

In another particularly advantageous aspect of the present invention, the adhesive comprising the sulfopolyester can be separated from the substrates, after use, in a recycling process comprised of repulping a repulpable article. Separation is accomplished by repulping the entire laminate structure. Repulping per se is within the skill of the artisan. Thus, this invention also concerns, in a more preferred embodiment, applying the water-dispersible adhesive compositions, described more fully below, in liquid form to a surface of a substrate and, while the adhesive composition remains in liquid form, applying a second surface of a substrate to the water-dispersible adhesive composition thereby forming an article of manufacture that comprises the water-dispersible adhesive composition laminated between two substrates or two surfaces of a substrate. It will be recognized by one of skill in the art in possession of the present disclosure that the water-dispersibility of the adhesive composition according to the present invention allows for a more environmentally-friendly product which will more readily disperse in an aqueous environment, i.e., municipal water/sewage systems, thus rendering such a product more amenable to being flushed down a toilet. Such products include, but are not limited to, personal hygiene products.

Yet another aspect of this invention comprises bonded articles of manufacture having the adhesive composition between two substrates such as in carton sealings, corrugated board, bookbinding, sanitary napkins and diaper constructions.

As previously mentioned, the utility of certain water-dispersible sulfopolyester compositions as adhesive raw materials is described in detail by the teachings of U.S. Pat. Nos. 5,543,488; 5,552,495; 5,552,511; 5,571,876; and 5,605,764, and European Patent Applications EP 0 761 795 A2 and EP 0 781 538 A2. The sulfopolyester according to the present invention can be used in any of the applications recited in these references.

The molecular weight of the water-dispersible polyesters is an important consideration to the formulation and application of the finished adhesives. Normally, it is desirable to achieve as high a molecular weight as possible to maximize physical properties, such as tensile strength, peel strength, resistance to cold flow, and the like. Specification of a molecular weight range is particularly relevant to hot-melt adhesives, where too high of a molecular weight will result in melt viscosities that exceed the capabilities of application methods that are known in the art. At the other extreme, very low molecular weights are also unsuitable as they will lack cohesive strength. As known to the skilled artisan, molecular weight for adhesive purposes is generally expressed in terms of inherent viscosity. It is preferred that the water-dispersible polyesters of the present invention when used in the aforementioned adhesive applications have an inherent viscosity (IV) of at least 0.1 dL/g, more preferably about 0.1 to 0.8 dL/g, still more preferably 0.2 to 0.8 dL/g, measured in a 60/40 parts by weight solution of phenol/tetrachloroethylene at 25° C., and at a concentration of about 0.50 g of polymer in 100 mL of solvent.

Glass transition temperature (Tg) is another critical parameter related to adhesive performance and it is preferred that the Tg is advantageously less than ambient temperatures (20° C.) to insure flexibility. It is generally preferred that the Tg should be as low as possible to ensure a flexible product that will not crack or shatter at more extreme use temperatures. However, lowering the Tg of amorphous sulfopolyesters generally results in a lowering of the Ring and Ball Softening Point (RBSP). The RBSP is commonly used in the specification of adhesives as described in ASTM E 28 and it is generally desirable to have as high a RBSP as high as possible to provide heat resistance to the adhesive. Although Tg and RBSP are generally inversely related, it is possible to maximize the difference between them to achieve optimum performance. It is particularly advantageous that the Tg be from −50 to 20° C., more preferably below 20° C., still more preferably less than 0° C., and even more preferably less than −10° C., while the RBSP is preferably at least 80° C., more preferably at least 100° C. Futhermore, it is preferred to have the difference between the Tg and RBSP be at least 90° C., more preferably 100° C. Crystalline compositions are also within the scope of this invention and represent one avenue to low Tg and high RBSP polyester compositions as crystalline melting points (Tm) are usually far above the Tg.

The adhesive compositions according to the present invention are particularly useful due to their good combination of properties and are suitable for use as adhesives for many substrates including non-woven assemblies, paper, wood, plastic, and metal. In the case of paper and wood pulp derived substrates, improved repulpability/recyclability result.

In the case of a laminated structure, according to one embodiment of the invention the adhesive composition is applied to one substrate with a second substrate being placed on top of the adhesive, thus forming an article having the adhesive laminated between two substrates. Depending on the end-use, it is possible for the substrates to be dissimilar materials, i.e., paper can be laminated to plastic.

It is within the scope of this invention to also apply the polyester composition in a liquid vehicle that includes water, organic solvents, and combinations thereof. Preferred organic solvents are aromatic and polar solvent, such as ketones (i.e., methy ethyl ketones), toluene, glycol ethers, glycol esters, and alcohols. Depending on the specific application/end-use requirements, typical solution concentrations may range from about 5 to about 80% polyester based on total weight of solution. Elevated application temperatures may be advantageously employed, especially at higher concentrations of polyester. Additives known in the liquid formulation art, such as surfactants, thickeners, biocides, defoamers, and the like, may also be present. When applied as a solution, the adhesive compositions are most often applied by conventional processes, such as spray coating, roll coating, brush coating, dip coating, and the like.

It is a preferred embodiment to use the polyester compositions of this invention as hot melt adhesive raw materials. The hot melt adhesive is typically applied at a temperature of about 125° C. to about 250° C., preferably 150° C. to 200° C., to a surface of a substrate, and while remaining molten and pliable, applying a second surface of a substrate to the water-dispersible hot melt adhesive composition that has been laminated between two substrates or two surfaces of a substrate.

In another preferred embodiment, the sulfopolyesters according to the present invention may be used in pressure sensitive adhesive formulations (PSAs), and the PSAs may be hot-melt PSAs. As is known to the skilled artisan, the various formulations, whether as hot melt adhesives, PSAs, or hot-melt PSAs can be made principally by varying additives, and more particularly, principally by varying the amount of tackifiers and/or plasticizers.

The polyesters have functional end groups, which are predominately hydroxyl in the case of the present invention, and may be crosslinked with melamines, polyepoxides, diisocyanates and other suitable compounds known in the art. Although crosslinking is not preferred because it would prevent or at least decrease water dispersibility or repulpability, it is within the scope of this invention to include crosslinking since it would improve tensile properties. However, non-crosslinked sulfopolyesters are preferred.

The presence of reactive end groups also allows for reactive blending by transesterifying with other polyesters. Such reactive blending is within the scope of the invention. Reactive blending by transesterification is within the skill of the artisan in possession of the present disclosure. In a preferred embodiment, the sulfopolyesters according to the present invention are reactively blended with biodegradable polyesters, such as those described in U.S. Pat. Nos. 5,446,079, 5,580,911, and 5,599,858.

While adhesives consisting of the neat sulfopolyester are not excluded, most often it is intended for the polyesters to serve as one of the components in an adhesive formulation. The other constituents may be incorporated to tailor the properties of the final adhesive to a variety of applications. Often it is preferred that the formulation components have sufficient polarity to render a compatible formulation with the polyester. Thus, suitable formulation components include tackifiers, plasticizers, elastomers, amorphous and crystalline thermoplastic resins, waxes, oils, diluents, and other additives.

Additives may be present in the solid polymer as needed. Additives include, but are not limited to: oxidative stabilizers, UV absorbers, colorants, pigments, fillers, nucleating agents, catalysts, and fragrances, all of which are known per se.

Oxidative stabilizers are typically added as packages where primary and secondary components combine to provide an optimum of increased pot-life, shelf-life, resistance to skinning, and minimization of discoloration, especially at elevated temperatures. Stabilizers are typically added at levels between 0.05 and 1 weight percent, more preferably 0.1 to 0.5 weight percent, based on the weight of total formulation (including solvent, if present). Suitable stabilizers include the antioxidant type and generally consist of hindered phenols, thio-compounds, and phosphorous-containing compounds. Especially useful due to its efficacy and easily to handle powder form is Irganox 1010 (Ciba-Geigy, Hawthorne, N.Y.), which is a pentaerythritol tetrakis-3(3,5-di-tertiary butyl-4-hydroxyphenyl)propionate.

Fillers, such as silicas (e.g., fumed silica known as Cabosil from Cabot Corp.), silicates, aluminum oxides, carbon black, calcium carbonate, talc, barium sulfate, gypsum, are often useful as a low cost means to increase the RBSP and reduce the cold flow of the adhesive formulation. It is preferred that fillers, if added, be present in the adhesive composition in the amount of no more than 65 percent by weight. More preferably, fillers are present in the amount of from 1 to 40 percent by weight, based on the total weight of the composition (including solvent, if any).

Plasticizers are added to lower the Tg and typical examples are found in phthalate esters, adipate esters, glycols, glycol dibenzoates, and phenols. Preferred examples of esters are di-octyl phthalate and di-octyl adipate. Polymeric plasticizers are also useful and represent a preferred embodiment of the present invention. Polymeric plasticizers may be crystalline or amorphous, and are typically lower molecular weight polymers possessing a low Tg, preferably less than 0° C., and more preferably less than −20° C. Examples of suitable polymeric plasticizers include: polyethylene glycol, polypropylene glycol, polytetramethylene glycol, and polyester resins. Polyethylene glycol is preferred due to its inherent water solubility. Plasticizers, if added, may be present in the adhesive compsition in the amount of up to 65 percent by weight, more preferably from 1 to 40 percent by weight, based on the total weight of the composition (including solvent, if any).

Elastomers are generally block copolymers of styrene and 1,3-dienes, such as those marketed by Shell Chemical under the KRATON™ tradename. Another elastomer type is a polyolefin synthesized using metallocene catalysts to obtain polymer architectures having alternating sequences of crystalline and amorphous character. The crystalline regions serve as crosslinks to provide the elastomeric properties. Elastomeric properties are usually enhanced by the absence of substantial amounts of crystallinity. Additional examples of elastomers may be found in copolymer of ethylene with functional comonomers such as vinyl acetate or acrylic acid. In general, the compatibility of elastomers will be enhanced by the incorporation of polar comonomers. Elastomers, if added, are present in the adhesive composition in the amount of up to 65 weight percent, more preferably 1 to 40 weight percent, based on the total weight of the composition (including solvent, if any).

Tackifiers may be added to the polyester composition to increase the softening point, reduce cold flow, and improve the adhesion. Tackifiers are typically selected from at least one of the groups consisting of hydrocarbon resins, synthetic polyterpenes, functional copolymers and rosin esters. Hydrocarbon resins are disclosed in U.S. Pat. No. 3,850,858 and functional copolymers, such as styrene-co-maleic anhydride are known in the art. Hydrocarbon resins, prepared according to U.S. Pat. No. 3,701,760, polyterpenes, and rosin esters can be used alone or in combinations. These tackifying resins, preferably have softening points of at least 100° C., more preferably at least 120° C., and may comprise 10 to 70% by weight of the adhesive formulation, preferably 20 to 50% by weight. Suitable resins and rosin esters are the terpene polymers having a sufficiently high RBSP as discussed supra, specifically, resinous materials including dimers as well as higher polymers obtained by polymerization and/or copolymerization of terpene hydrocarbons such as the alicyclic, monocyclic, and bicyclic monoterpenes and their mixtures, including alloocimene,carene, isomerized pinene, pinene, dipentene, terpinene, terpinolene, limonene, turpentine, a terpene cut of fraction, and various other terpenes. Commercially available resins of the terpene type include the Zonarez terpene B-series and the 7000 series from Arizona Chemical. Also included are the rosin esters with acid numbers above 5, such as the Zonatac resins from Arizona Chemical. Particularly useful materials are terpene mixtures containing sulfate terpene and at least 20% of at least one other terpene selected from the group consisting of pinene, limonene, or dipentene. Tackifiers, when present, are added to the adhesive composition in the amount of no more than 65 weight percent, more preferably from 1 to 40 weight percent, based on the total weight of the composition (including solvent, if any).

In a preferred embodiment, at least one additive selected from crystalline thermoplastic polymers and crystalline waxes is included in the composition according to the present invention. By "crystalline" is meant that the polymer or wax has a defined melting point. It is preferred that the crystalline thermoplastic polymers not be crosslinked. The crystalline thermoplastic polymers and/or crystalline waxes, when present, are added in the amount of no more than 65 weight percent, more preferably 1 to 40 weight percent, based on the total weight of the composition (including solvent, if any).

Crystalline thermoplastic polymers may also be incorporated to reduce cold flow, improve tensile properties, and raise the softening point. Particularly useful for this purpose are copolymers of ethylene with vinyl acetate, acrylic acid, methacrylic acid (e.g., SURLYN a DuPont tradename), glycidyl methacrylate, hydroxyethyl methacrylate, alkyl acrylates, alkyl methacrylates, and maleated polyolefins. Also included are crystalline polyesters, polyamides, polyester-ethers, polyester-amides, and high molecular weight polyethylene oxides. As discussed previously, the compatibility of the polyester is enhanced by the presence of sufficient polarity within the ethylene copolymer.

Lower molecular weight crystalline waxes are also useful for certain applications, particularly the functional varieties, such as stearamides, preferably hydroxy stearamide; low molecular weight maleated polyolefins may also be useful waxes.

The present copolyester composition can be modified with random or alternating styrenic copolymers that are prepared by any of the several methods available for their synthesis. For example, the copolymers may be obtained by solution copolymerization directly from the respective monomers by incremental additions of the more reactive monomer as taught by U.S. Pat. No. 2,971,939 or by a continuous recycle polymerization process in U.S. Pat. Nos. 2,769,804 and 2,989,517. Commercially available random or alternating copolymers include the "Dylark" styrene/maleic anhydride copolymers.

In a preferred process according to the present invention, the adhesive compositions may be prepared using one or more or the above recited additives by blending with the block copolyester at melt temperatures of about 150–250° C. and mixing until a homogeneous mixture is obtained. A cowles stirrer or sigma blade mixer provides effective mixing for these preparations.

Other polyesters may be physically blended or reactively blended with the above recited sulfopolyester. Particularly useful polyesters to be blended, whether as a physical mixture or by reactively blended, include biodegradable polyesters such as those disclosed above. More preferably, polyesters based on 1,4-butanediol/adipic acid polyesters are useful to reduce cold flow, lower Tg, and increase tensile strength.

In the more preferred embodiment of the adhesive formulation according to the present invention, including the laminated articles of manufacture adhered therewith, the adhesive formulation includes a linear, water-dispersible sulfopolyester, having a dry Tg ranging from −50 to 20° C., comprised of the reaction products of:

(i) a dicarboxylic acid that is not a sulfomonomer, preferably in the amount of 70 to 100 mol percent, based on total moles of acid equivalents. The dicarboxylic acid component is preferably selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms;

(ii) at least one difunctional sulfomonomer containing at least one metal sulfonate group bonded to an aromatic ring wherein the functional groups are ester, hydroxyl, or carboxyl, preferably in the amount of 2 to 20, more preferably 2.5 to 15 mol percent, based on total moles of acid and glycol equivalents. The difunctional sulfomonomer is preferably selected from dicarboxylic acids or esters thereof containing at least one metal sulfonate group bonded to an aromatic ring, a diol containing a metal sulfonate group bonded directly to an aromatic ring, and a hydroxy acid containing a metal sulfonate group bonded directly to an aromatic ring;

(iii) from about 25 to 99.9 mol %, based on total mol % of hydroxyl equivalents, of the polyethylene glycol having the structure:

$$H-(OCH_2CH_2)_x-OH \qquad (II)$$

where n is an integar from 2 to 6, most preferably 2;

(iv) at least one polyethylene glycol having the structure:

$$H-(OCH_2CH_2)_y-OH \qquad (III)$$

where y is 3 to about 500, more preferably y is 20 to 500, and even more preferably y is 21 to 100, where the species represented by (III) is preferably present in the amount of 0.1 to 20 mol percent, more preferably in the amount of 0.1 to 10 mol percent, based on total moles of hydroxyl equivalents, and with the preferred proviso that the mol percent of said polyethylene glycol is inversely proportional to the quantity n within said range;

x<y;

the polymer containing substantially equal molar proportions of acid equivalents (100 mol %) and glycol equivalents (100 mol %) wherein the inherent viscosity is at least 0.1 dL/g, more preferably 0.1 to 0.8 dL/g, even more preferably about 0.25 dL/g, as measured in a 60/40 parts by weight solution of phenol/tetrachloroethane at 25° C. at a concentration of about 0.50 g of polymer in 100 ml of the solvent.

The actual viscosity of the final adhesive formulation depends on the application, and can range, for example, from a "water-thin" formulation to a thick paste formulation.

EXAMPLES

The following examples are intended to illustrate the present invention. Numerous modifications and variations are possible, and it is to be understood that within the scope of the appended claims, the invention may be practiced otherwise than as specifically described herein.

Example 1

Preparation of Water-Dispersible Block Polyester Containing 12 Mole % 5-Sodiosulfoisophthalate and 5 Mole % PEG1000

A 500 mL round bottom flask equipped with a ground-glass head, agitator shaft, nitrogen inlet, and a sidearm to allow for removal of volatile materials was charged with 85.6 grams (0.44 mol) dimethyl terephthalate, 17.8 grams (0.06 mol) dimethyl-5-sodiosulfoisophthalate, 42.2 grams (0.68 mol) ethylene glycol, 31.3 grams (0.30 mol) diethylene glycol, 25.0 grams (0.025 mol) Carbowax® polyethylene glycol 1000, 0.49 grams (0.006 mol) anhydrous sodium acetate, and 0.5 mL of a 1.46% (w/v) solution of titanium isopropoxide in n-butanol. The flask was purged with nitrogen and immersed in a Belmont metal bath at 200° C. for 90 minutes and 210° C. for an additional 90 minutes under a slow nitrogen sweep with sufficient agitation. After elevating the temperature to 280° C. a vacuum <=0.5 mm was attained and held for 30 minutes to perform the polycondensation. The vacuum was then displaced with a nitrogen atmosphere and the clear, slightly yellow polymer was allowed to cool before removal from the flask. An inherent viscosity of 0.52 dL/g was determined for the recovered polymer according to ASTM D3835-79. NMR analysis indicated that the actual glycol composition was 60 mol % EG, 35 mol % DEG, and 5 mol % Carbowax® polyethylene glycol 1000. A glass transition temperature (Tg) of 28° C. was obtained for the polymer from thermal analysis by DSC. Tensile properties were obtained in the manner set forth by ASTM-D638. A tough, elastomeric material was observed as the yield stress and yield elongation were 15 MPa and 7%, respectively, while the break stress and elongation at break were 9 MPa and 175%, respectively.

Example 2

Preparation of Water-Dispersible Block Polyester Containing 12 Mole % 5-Sodiosulfoisophthalate and 0.5 Mole % PEG10,000

The apparatus and general procedure described in EXAMPLE 1 was used with the exception that polycondensation time was changed. The amounts initially charged to the flask were: 85.4 grams (0.44 mol) dimethyl terephthalate, 17.8 grams (0.06 mol) dimethyl-5-sodiosulfoisophthalate, 42.2 grams (0.68 mol) ethylene glycol, 31.8 grams (0.30 mol) diethylene glycol, 25.0 grams (0.0025 mol) polyethylene glycol (Mn=10,000 g/mol), 0.49 grams (0.006 mol) sodium acetate, and 0.5 mL of a 1.46% (w/v) solution of titanium(IV)isopropoxide in n-butanol. The polycondensaton was performed at 280° C. for 17 minutes at a pressure 0.35 mm of Hg. The recovered polymer had an inherent viscosity of 0.63 (ASTM D3835-79) and a Tg, as measured by DSC, of 19° C. Analysis by NMR indicated that the actual glycol composition was 58 mol % EG, 41.5 mol % DEG, and 0.5 mol % PEG10,000.

Example 3

Preparation of Water-Dispersible Block Polyester Containing 11 Mole % 5-Sodiosulfoisophthalate and 2 Mole % PEG1000

The apparatus and general procedure described in EXAMPLE 1 was used with the exception that the transesterification and polycondensation times were changed. The initial reactant charge consisted of: 67.9 grams (0.35 mol) dimethyl terephthalate, 19.4 grams (0.10 mol) dimethyl isophthalate, 14.8 grams (0.05 mol) dimethyl-5-sodiosulfoisophthalate, 24.2 grams (0.39 mol) ethylene glycol, 31.8 grams (0.30 mol) diethylene glycol, 7.5 grams (0.008 mol) Carbowax® polyethylene glycol 1000, 0.4 grams (0.005 mol) sodium acetate, and 0.35 mL of a 1.46% (w/v) solution of titanium(IV)isopropoxide in n-butanol. The polyesterification was conducted at 200° C. for 60 minutes and 225° C. for 90 minutes, followed by a polycondensation stage at 280° C. and 0.4 mm Hg for 37 minutes. Inherent viscosity and Tg values of 0.40 and 45° C., respectively, were obtained in the same manner as described previously. NMR analysis indicated the polymer acid composition was consistent with 69 mol % terephthalate, 20 mol % isophthalate, and 11 mol % 5-sodiosulfoisophthalate units, while the glycol portion consisted of 57 mol % EG, 41 mol % DEG, and 2.0 mol % Carbowax® polyethylene glycol 1000.

Example 4

Preparation of Water-Dispersible Block Copolyester Containing 11 Mole % 5-Sodiosulfoisophthalate and 6 Mole % PEG300

(Comparative)

The apparatus and procedure used were the same as EXAMPLE 1 with the exception that the transesterification was conducted at 200° C. for 60 minutes and 230° C. for 90 minutes, while the polycondensation was performed at 280° C. and 0.3 mm for 34 minutes. The reactants and their respective amounts were: 67.9 grams (0.35 mol) dimethyl terephthalate, 19.4 grams (0.10 mol) dimethyl isophthalate, 14.8 grams (0.05 mol) dimethyl-5-sodiosulfoisophthalate, 27.3 grams (0.44 mol) ethylene glycol, 21.2 grams (0.20 mol) diethylene glycol, 7.5 grams (0.025 mol) Carbowax® polyethylene glycol 300 (Mn=300 g/mol), 0.41 grams (0.005 mol) sodium acetate, and 0.32 mL of a 1.46% (w/v) solution of titanium(IV)isopropoxide in n-butanol. The recovered polymer was analyzed in the same manner as described previously and an inherent viscosity of 0.35 dL/g and a Tg of 40° C. were obtained. NMR analysis determined that the polymer structure (total mol %=200 containing equal amounts of acid and glycol units) was comprised of 70 mol % terephthalate, 19 mol % isophthalate, 11 mol % 5-sodiosulfoisophthalate, 58 mol % EG, 36 mol % DEG, and 5.9 mol % Carbowax® polyethylene glycol 300.

Example 5

Preparation of Water-Dispersible Polyester Containing 10 Mole % 5-Sodiosulfoisophthlate and 3.2 Mole % PEG600

(Comparative)

The apparatus described in EXAMPLE1 and the procedure followed in EXAMPLE 4 were used with the exception that the time of polycondensation was changed to 50 minutes. The initial reactant charge consisted of: 67.9 grams (0.35 mol) dimethyl terephthalate, 19.4 grams (0.10 mol) dimethylisophthalate, 14.8 grams (0.05 mol) dimethyl-5-sidiosulfoisophthalate, 27.3 grams (0.44 mol) ethylene glycol, 21.2 grams (0.20 mol) diethylene glycol, 9.0 grams (0.015 mol) Carbowax® polyethylene glycol 600 (Mn= 570–630 g/mol), 0.4 grams (0.005 mol) sodium acetate, and 0.33 mL of a 1.46% (w/v) solution of titanium(IV) isopropoxide in n-butanol. Inherent viscosity and Tg values of 0.35 and 46° C., respectively were obtained as before.

NMR analysis indicated the polymer composition was consistent with 69 mol % terephthalate, 21 mol % isophthalate, 10 mol % 5-sodiosulfoisophthalate, 63 mol % EG, 34 mol % DEG, and 3.2 mol % PEG600 structural units.

Example 6

Preparation of Water-Dispersible Polyester Containing 11 Mole % 5-Sodiosulfoisophthalate (Comparative)

The same apparatus was used as described in EXAMPLE 1. Initial reactant charges were: 77.6 grams (0.40 mol) dimethyl terephthalate, 19.4 grams (0.10 mol) dimethyl isophthalate, 16.28 grams (0.055 mol) dimethyl-5-sodiosulfoisophthalate, 62.0 grams (1.00 mol) ethylene glycol, and 0.38 mL of a 1.46% (w/v) solution of titanium (IV)isopropoxide in n-butanol. After purging the reactants with nitrogen, the flask was immersed in a Belmont metal bath at 200° C. for 60 minutes and 230° C. for an additional 120 minutes under a nitrogen sweep with sufficient agitation to complete the transesterification. After elevating the temperature to 280° C., a vacuum of <0.5 mm Hg was instituted and maintained for 93 minutes to accomplish the polycondensation stage. Inherent viscosity and Tg measurements were performed as described supra with the respective values, 0.42 dL/g and 55° C., noted for each. The actual composition, as determined by NMR and GC analyses, was consistent with 64 mol % terephthalate, 25 mol % isophthalate, 11 mol % 5-sodiosulfoisophthalate, 67 mol % EG, 26 mol % DEG, and 7 mole % triethylene glycolate (TEG) units.

Comparison of Film and Fiber Sizing Properties

Table 1, below, shows the comparative fiber sizing and film properties of polymers synthesized in the previous EXAMPLES.

All of the polymers were dispersed in deionized water at a solids level of 30 weight % and diluted appropriately for slashing. Film tests were obtained by casting and drying circular film dots on a sheet of mylar. Fiber testing was accomplished by passing (i.e., slashing) a 40 filament/150 denier warp drawn polyester yarn through an aqueous dispersion of the size composition and drying.

In the table below, T represents the amount of terephthalate, I the amount of isophthalate, SIP the amount of the sulfomonomer, EG, DEG, and PEG representing, respectively, the amount of ethylene glycol, diethylene glycol, and polyethylene glycol in the sulfopolyester.

TABLE 1

Comparative Data for Film and Fiber Properties

| EXAMPLE Number | Composition (Mole %) | % Pickup | Adhesion | Flexibility | Abrasion Cycles |
|---|---|---|---|---|---|
| 3 | T = 69, I = 20, SIP = 11, EG = 57, DEG = 41, PEG 1000 = 2.0 | 4.5 | PASS | PASS | 100 |
| 4 | T = 70, I = 19, SIP = 11, EG = 58 DEG = 36, PEG 300 = 5.9 | 4.8 | PASS | FAIL | 30 |
| 5 | T = 69, I = 21, SIP = 10, EG = 63, DEG = 34, PEG 600 = 3.2 | 4.3 | PASS | FAIL | 40 |
| 6 | T = 64, I = 25, SIP = 11, EG = 67, DEG = 26, TEG = 7 | 4.2 | FAIL | FAIL | 65 |

*Total acid and glycol = 200 mole %

The results in Table 1 clearly demonstrate the efficacy of the present invention as a textile size; EXAMPLES 4, 5, and 6 are outside the scope and teachings of this invention and are included for the sole purpose of distinguishing these non-obvious teachings from the prior art, while EXAMPLE 3 is a preferred embodiment of the present invention. Pickup level or the amount of dry size applied to the fiber was essentially constant for all of the EXAMPLES, which had nearly the same ratios of T: I: SIP in each case. The polyester that did not contain any PEG (EXAMPLE 6) failed both the adhesion and flexibility tests and had only 65% of the abrasion resistance that was shown by EXAMPLE 3. The samples containing the lower molecular weight polyethylene glycols (EXAMPLES 4 and 5) both failed the flexibility test and exhibited greatly inferior abrasion resistance in comparison to EXAMPLE 3. It is to be noted that the level of polyethylene glycol was chosen for EXAMPLES 3, 4, and 5 to yield a constant weight percent of polyethylene glycol, thus further demonstrating the uniqueness of sulfopolyesters containing blocks of high molecular weight polyethylene glycol.

Adhesive Tests

In the examples set forth below, the T-peel adhesion test was run according to ASTM D1876. There is no detectable odor observed for any of the adhesive compositions set forth below. Odor detection was made by a human observer.

Example 7

Adhesive Properties of Neat Polyester Containing 11 Mole % 5-Sodiosulfoisophthalate and 5 Mole % PEG1000

A copolyester was synthesized using the apparatus and general procedure described in EXAMPLE 1. The composition contained only isopthalate, diethylene glycolate, 5-sodiosulfoisophthalate, and polyethylene glycolate units and was determined to have an IV of 0.40 and a Tg of 10° C. The RBSP was 102° C. and a melt viscosity of 144,900 cp at 177° C. A T-peel adhesion test was run and a value of 51 g/mm was recorded for adhesion to a polyethylene (PE) substrate.

Example 8

Adhesive Formulation Based on a Polyester Containing 11 Mole % 5-Sodiosulfoisophthalate and 5 Mole % PEG1000

The copolyester synthesized in EXAMPLE 7 was formulated in the following ratios: 60-parts copolyester, 10 parts of Benzoflex 9-88 plasticizer (a product of Velsicol), and 30 parts of Staybelite wood rosin (a product of Hercules). The formulation had a melt viscosity of 1800 cp at 177° C. and was completely dispersible in tap water. T-peel results of 10.7 g/mm and 21 g/mm were measured for mylar and PE to stainless steel substrates, respectively.

Example 9

Adhesive Properties of a Neat Polyester containing 11 Mole % 5-Sodiosulfoisophthalic acid and 10 Mole % PEG1000

A copolyester was synthesized using the apparatus and procedure described in EXAMPLE 1 and was determined to have the same monomer components as EXAMPLE 7. The copolyester had a Tg of 4° C., RBSP of 86° C. and a melt viscosity of 37,500 cp at 177° C. A 77.9 g/mm T-Peel adhesion was recorded for PE substrates and the sample exhibited cohesive failure after an elongation of 1324% was obtained. Complete dispersibility was noted in tap water after <4 hours at room temperature.

Example 10

Adhesive Formulation Based on a Polyester Containing 11 Mole % 5-Sodiosulfoisophthalate and 10 Mole % PEG1000

The copolyester synthesized in EXAMPLE 9 was formulated in the exact same manner as EXAMPLE 8. A melt viscosity of 1200 cp at 177° C. was obtained for the formulation, which exhibited a T-Peel adhesion of 4.5 g/mm to PE substrates.

Example 11

Adhesive Properties of a Neat Polyester Containing 12 Mole % 5-Sodiosulfoisophthalate and 45 Mole % Triethylene Glycol (TEG)

The same general apparatus configuration was used as described in EXAMPLE 1 except a 1000 mL flask was employed to increase the scale of the synthesis. An initial charge consisting of: 148 g (0.89 mole) isophthalic acid, 32.6 g (0.11 mole) dimethyl-5-sodiosulfoisophthalate, 106 g (1.0 mole) diethylene glycol, 75 g (0.5 mole) TEG, 0.9 g (0.01 mole) sodium acetate, and 100 ppm of Ti that was added as titanium(IV)tetrisopropoxide was added to the flask before purging with nitrogen. The flask was then immersed in the Belmont metal bath at 200 C for 60 minutes and 210° C. for 2 hours under a slow sweep of nitrogen with sufficient agitation. After elevating the temperature to 250° C. a vacuum of 0.2 mm Hg was attained and held for 135 minutes to perform the polycondensation. The vacuum was displaced with nitrogen and the hazy, amber polymer melt was allowed to cool before removal from the flask. An inherent viscosity of 0.32 was determined for the polymer and NMR analysis indicated that the glycol composition was 55 mole % DEG and 45 mole % TEG. A Tg of 17° C., RBSP of 114° C., and melt viscosity of 273,000 cp at 177° C. were recorded for the polymer. The T-peel adhesion was 57 g/mm when bonded to PE substrates.

Example 12

Onto a 4×6 inch corona-treated polyethylene substrate was placed a 1 ml thick layer of a sulfopolyester adhesive composition according to the present invention. The thus-treated substrate was place in a plastic bag. the bag was sealed and placed into an oven at 110° F. (43.30° C. ) for 1 week. The bag was then opened and there was no detectable odor.

Examples 7–11 demonstrate that the sulfopolyester according to the present invention is useful in bonding to various substrates, including plastic and metal substrates, and that the adhesive material is water dispersible. Examples 7–12 demonstrate that there is no detectable odor to humans, with Example 12 particularly showing that even under moderate heating the sulfopolyester does not have an objectionable odor, which is highly surprising.

Accordingly, the present inventors have shown the utility of a linear, block sulfopolyester having at least two different polyethylene glycol units. The sulfopolyester according to the present invention is water dispersible and has excellent adhesive properties to a wide variety of substrates, from plastics, including but not limited to polyolefins and polyesters, to fabrics, including but not limited to natural and synthetic fabrics, and woven and non-woven fabrics, to metals, including but not limited to metal foils, and to wood and wood-derived products, including but not limited to paper. It will be recognized by those of skill in the art that variations and modifications other than as specifically described herein can be effected within the spirit and scope of the appended claims. Moreover, all patents, patent applications, and literature references noted above are incorporated herein by reference for any disclosure pertinent to the practice of this invention.

We claim:

1. A linear, water-dispersible, block sulfopolyester including:
   (i) 70 to 100 mol %, based on total moles of acid equivalents, of at least one difunctional dicarboxylic acid which is not a sulfomonomer;
   (ii) 2 to 15 mol %, based on total moles of acid and glycol equivalents, of at least one difunctional sulfomonomer containing at least one metal sulfonate group bonded to an aromatic ring, wherein the functional groups on said difunctional sulfomonomer are selected from the group consisting of esters, hydroxyl, or carboxyl groups to provide water-dispersibility to said sulfopolyester;
   (iii) from about 25 to 99.9 mol %, based on the mol % of hydroxyl equivalents of at least one polyethylene glycol having the structure:

   $H(OCH_2CH_2)_x—OH$ where x is an integer of from 2 to 6;
   (iv) 0.1 to 20 mol %, based on total moles of hydroxyl equivalents of at least one polyethylene glycol having the structure:

   $H(OCH_2CH_2)_y—OH$ where y is an integer of from 3 to about 500;
   wherein x<y;
   wherein the sulfopolyester contains substantially equal molar proportions of acid equivalents and glycol equivalents, and wherein said sulfopolyester has an inherent viscosity of at least 0.28 dL/g measured in a 60/40 parts by weight solution of pheno/tetrachloroethane at 25° C. at a concentration of about 0.50 g of sulfopolyester in 100 ml of solvent.

2. The linear, water-dispersible, block sulfopolyester according to claim 1, having a dry Tg ranging from −50 to 20° C., and comprising repeating units including:
   (i) 85 to 100 mol %, based on total moles of acid equivalents, of a dicarboxylic acid that is not a sulfomonomer;
   (ii) 5 to 10 mol %, based on total moles of acid and glycol equivalents, of at least one difunctional sulfomonomer containing at least one metal sulfonate group bonded to an aromatic ring wherein the functional groups are ester, hydroxyl, or carboxyl;

(iii) from about 25 to 75 mol %, based on total mol % of hydroxyl equivalents, of the polyethylene glycol having the structure:

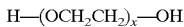

where x is 2;

(iv) 0.25 to 5 mol %, based on total moles of hydroxyl equivalents, at least one polyethylene glycol having the structure:

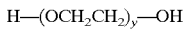

where y is an integer of from 3 to about 500; and wherein x<y;

said sulfopolyester containing substantially equal molar proportions of acid equivalents and glycol equivalents and wherein the inherent viscosity is 0.28 to 0.8 dL/g, measured in a 60/40 parts by weight solution of pheno/tetrachloroethane at 25° C. at a concentration of about 0.50 g of sulfopolyester in 100 ml of solvent.

3. A low odor adhesive formulation comprising the linear, water-dispersible, block sulfopolyester according to claim 1.

4. A low odor adhesive formulation comprising the linear, water-dispersible, block sulfopolyester according to claim 2.

5. The adhesive formulation according to claim 3, further comprising at least one additive selected from the group consisting of oxidative stabilizers, fillers, plasticizers, elastomers, tackifiers, crystalline thermoplastic polymers, crystalline waxes, and mixtures thereof.

6. The adhesive formulation according to claim 5, where y is from 21 to 100.

7. The adhesive formulation according to claim 5, where y is from 3 to 19.

8. The adhesive formulation according to claim 5, wherein said at least one additive is selected from the group consisting of thermoplastic polymers and crystalline waxes.

9. The adhesive formulation according to claim 5, further comprising a biodegradable polyester physically or reactively blended therewith.

10. The adhesive formulation according to claim 5, wherein said adhesive formulation is a hot-melt adhesive formulation.

11. The adhesive formulation according to claim 5, wherein said adhesive formulation is a pressure-sensitive adhesive formulation.

12. The adhesive formulation according to claim 5, wherein said adhesive formulation is a hot-melt, pressure-sensitive adhesive formulation.

13. The adhesive formulation according to claim 4, wherein said sulfopolyester has a Tg of from −50 to 20° C., and RBSP of at least 80° C.

14. The adhesive formulation according to claim 13, wherein the difference between the Tg and RBSP of said sulfopolyester is at least 90° C.

15. An article of manufacture comprising at least one substrate and having applied thereto an adhesive composition comprising the sulfopolyester composition according to claim 2.

16. The article of manufacture according to claim 15, wherein said at least one substrate is selected from the group consisting of plastics, fabrics, metals, wood, and wood-derived products.

17. The article of manufacture according to claim 15, wherein said sulfopolyester composition further comprises at least one additive selected from the group consisting of oxidative stabilizers, fillers, plasticizers, tackifiers, crystalline thermoplastic polymers, crystalline waxes, and mixtures thereof.

18. The article of manufacture according to claim 15, comprising a first substrate having at least a portion of one surface thereof contacted with said adhesive composition and a second substrate having at least a portion of one surface thereof contacting said adhesive composition in contact with said first substrate, and wherein said first and second substrates are independently selected from the group consisting of plastics, fabrics, metals, wood, and wood-derived products.

19. A linear, water-dispersible, block sulfopolyester comprising repeating units of sulfomonomers containing at least one sulfonate group attached to an aromatic ring and polyethylene glycol, the improvement comprising having at least two different polyethylene glycol units of differing molecular weights, wherein at least one polyethylene glycol unit has the structure:

where y is an integer of from 3 to about 500;
said sulfopolyester characterized by being a low odor, linear, water-dispersible sulfopolyester having a dry Tg ranging from −50 to 20° C., an inherent viscosity of at least 0.28 dL/g as measured in a 60/40 parts by weight solution of phenol/tetrachloroethane at 25° C. at a concentration of 0.50 g of polymer in 100 mol of solution.

20. The sulfopolyester according to claim 19, wherein the difference between the Tg and RBSP of said sulfopolyester is at least 90° C.

21. The linear, water-dispersible, block sulfopolyester of claim 1, wherein the inherent viscosity ranges from 0.4 to 1.1 dL/g.

22. The linear, water-dispersible, block sulfopolyester of claim 1, wherein is 20 or greater.

23. The linear, water-dispersible, block sulfopolyester of claim 1, wherein the component (iv) polyethylene glycol is a high molecular weight polyethylene glycol with a molecular weight of at least 900.

24. The linear, water-dispersible, block sulfopolyester of claim 23, wherein the molecular weight of said high molecular weight polyethylene glycol is at least 1000.

25. The linear, water-dispersible, block sulfopolyester of claim 2, wherein the Tg is less than 0°C.

26. An article of manufacture comprising at least one substrate and having applied thereto an adhesive composition comprising the linear, water-dispersible, block sulfopolyester according to claim 1.

27. An article of manufacture comprising at least one substrate and having applied thereto an adhesive composition comprising the linear, water-dispersible, block sulfopolyester according to claim 19.

28. A linear, water-dispersible, block sulfopolyester including:

(i) 70 to 100 mol%, based on total moles of acid equivalents, of at least one difunctional dicarboxylic acid which is not a sulfomonomer;

(ii) 2 to 15 mol%, based on total moles of acid and glycol equivalents, of at least one difunctional sulfomonomer containing at least one metal sulfonate group bonded to an aromatic ring, wherein the functional groups on said difunctional sulfomonomer are selected from the group consisting of esters, hydroxyl, or carboxyl groups to provide water-dispersibility to said sulfopolyester;

(iii) from about 25 to 99.9 mol%, based on the mol% of hydroxyl equivalents of at least one polyethylene glycol having the structure:

where x is an integer of from 2 to 6; (iv) 0.1 to 5 mol%, based on total moles of hydroxyl equivalents of at least one polyethylene glycol having the structure:

where is an integer of from 3 to 500;
wherein x<y;
wherein the sulfopolyester contains substantially equal molar proportions of acid equivalents and glycol equivalents, and wherein said sulfopolyester has an inherent viscosity of at least 0.1 dL/g measured in a 60/40 parts by weight solution of phenol/tetrachloroethane at 25°C at concentration of about 0.50 g of sulfopolyester in 100 ml of solvent.

29. The linear, water-dispersible, block sulfopolyester of claim 28, wherein y is 20 or greater.

30. The linear, water-dispersible, block sulfopolyester of claim 28, wherein the component (iv) polyethylene glycol is a high molecular weight polyethylene glycol with a molecular weight of at least 900.

31. The linear, water-dispersible, block sulfopolyester of claim 30, wherein the molecular weight of said high molecular weight polyethylene glycol is at least 1000.

32. The linear, water-dispersible, block sulfopolyester of claim 28, wherein the Tg ranges from 30–60°C.

33. The linear, water-dispersible, block sulfopolyester of claim 32, wherein the Tg ranges from 35–50°C.

34. The linear, water-dispersible, block sulfopolyester of claim 28, wherein the inherent viscosity is at least 0.25 dL/g.

35. The linear, water-dispersible, block sulfopolyester of claim 34, wherein the inherent viscosity is at least 0.30 dL/g.

36. A fibrous article sized with a sizing composition comprising a linear, water-dispersible, block sulfopolyester according to claim 28.

* * * * *

UNITED STATES PATENT AND TRADEMARK OFFICE
CERTIFICATE OF CORRECTION

PATENT NO : 6,162,890
DATED : December 19, 2000
INVENTOR(S) : Scott E. GEORGE, et al.

It is certified that error appears in the above-identified patent and that said Letters Patent is hereby corrected as shown below:

IN THE CLAIMS:

In col. 20, lines 55-56, replace "pheno/ tetrachloroethane" with --phenol/tetrachloroethane--.

In col. 21, lines 21-22, replace "pheno/ tetrachloroethane" with --phenol/tetrachloroethane--.

In col. 21, line 23, replace "sulfopolyester" with --polymer--.

In col. 22, line 38, after "wherein" insert -- y--.

In col. 23, line 15, after "where" insert -- y--.

Signed and Sealed this

Twenty-ninth Day of May, 2001

NICHOLAS P. GODICI

Attesting Officer

Acting Director of the United States Patent and Trademark Office